March 12, 1968 MIYAJI TOMOTA 3,373,271

ELECTRONIC COMPUTING CIRCUIT

Filed June 11, 1964

INVENTOR.
Miyaji Tomota

BY

Hill, Sherman, Meroni, Gross & Simpson

ATTORNEYS

United States Patent Office 3,373,271
Patented Mar. 12, 1968

3,373,271
ELECTRONIC COMPUTING CIRCUIT
Miyaji Tomota, Musashino-shi, Tokyo, Japan, assignor to Kabushikikaisha Yokogawa Denki Seisakusho (Yokogawa Electric Works, Ltd.), Tokyo, Japan, a corporation of Japan
Filed June 11, 1964, Ser. No. 374,342
Claims priority, application Japan, June 29, 1963, 38/33,976; Feb. 6, 1964, 39/6,202
2 Claims. (Cl. 235—193)

ABSTRACT OF THE DISCLOSURE

The invention is directed to an electronic computing circuit having a plurality of switching circuits each including an electronic switching device for turning on and off a direct current voltage source. The operation of the switching devices is controlled by sensing the difference between a controlled voltage and a reference voltage to produce a difference voltage which, in turn, controls the operation of an alternating current generator. The amplitude of the alternating current generator is proportional to the value of the difference voltage when the difference voltage is of a given polarity. The output of the alternating current voltage generator is connected to a transformer which has a plurality of secondary windings each connected to one of the switching devices.

This invention relates to an electronic computing circuit of D-C analog signals, more particularly to an electronic computing circuit suitable for use in circuits of electronic type devices for industrial process.

In an electronic type control device for industrial process, there are supplied to the device electrical D–C analog signals obtained by measuring variations of a process and electrical D–C analog signals from other power source.

These electrical D–C analog signals are usually those which vary slowly with the lapse of time. There are required electronic computing circuits in which the aforementioned electrical D–C analog signals are applied to the input and electrical D–C analog signals are produced at the output in proportion to the value of an algebraic function having as a variable the value of the input analog signals. The requirements for these circuits are high reliability and long life. In addition, the respective input circuits must be electrically isolated from one another to which the input signals are applied and further the input circuits and the output circuits are also required to be isolated electrically.

A principal object of this invention is to provide an electronic computing circuit which is simple in structure and reliable in operation.

Another object of this invention is to provide an electronic computing circuit in which electrical D–C analog signals are produced the value of which is proportional to the product of the values of two or more electrical analog signals.

A further object of this invention is to provide an electronic computing circuit in which the output of electrical D–C analog signals is produced in proportion to the value of the ratio of two electrical D–C analog signals.

A still further object of this invention is to provide an electronic computing circuit in which the output of electrical time duration signals is produced the value of which is proportional to the square of the values of one or more electrical time duration signals.

A yet further object of this invention is to provide an electronic computing circuit in which the output of electrical D–C analog signals is produced the value of which is proportional to the square root of the values of one electrical time duration signal or more than two electrical analog signals.

Still another object of this invention is to provide an electronic computing circuit in which one input circuit to which electrical time duration signals are applied and an output circuit for leading out the electrical D–C digital signals are electrically isolated from each other.

Other objects, features and advantages of this invention will become apparent from the following description taken in conjunction with the accompanying drawings, in which.

Figure 1:
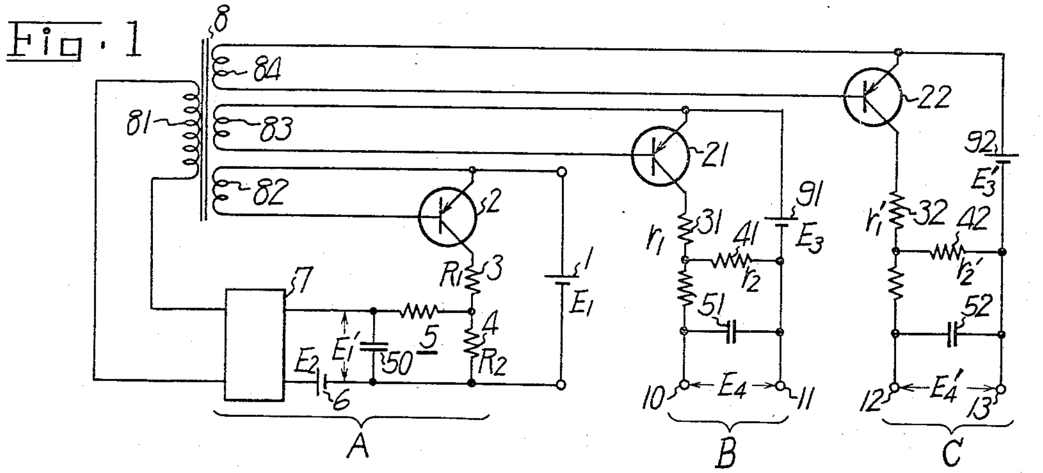
FIGURE 1 is a circuit diagram illustrating an example of an analog voltage computing device according to this invention.

The present invention is intended to provide an electronic computing circuit comprising a plurality of switch circuits each including a circuit for switching on and off the output of a D–C power source by means of a semiconductor switch element the switching operation of which is controlled by electrical control signals and a filter circuit for smoothing the output of the switching circuit, a comparator circuit for producing a difference voltage between the output D–C voltage of one of the filter circuits of the switch circuits and the output voltage of a second D–C power source, an A–C signal generating circuit connected to the comparator circuit for producing an output of intermittent or alternating waves of a certain frequency only while the difference voltage of a selected polarity is applied to the generating circuit, and transformer means connected between the A–C signal generating circuit and the control electrodes of the semiconductor switch elements of the respective switch circuits for supplying the output of the former to the latter. With reference to the drawing, an example of the electronic computing circuit of this invention will hereinafter be explained in detail.

FIGURE 1 is a circuit diagram illustrating an example of the analog voltage computing device of this invention. In this figure, the output end (a capacitor 50) of the filter and the output end of a second D-C power source 6 are connected in series to each other so as to apply an output end voltage $E_1'$ of the filter and an output voltage $E_2$ of the second D-C power source 6 in opposite polarities. 7 is an A-C signal generating circuit which is preferably composed of a small D-C amplifier controllably connected to a multivibrator circuit. The multivibrator circuit functions as an oscillator the amplitude of which is controlled by the D-C amplifier. The input of the D-C amplifier may be connected across the terminals of the comparator circuit to sense the difference voltage developed by the voltage $E_1'$ across the capacitor 50 and the reference voltage $E_2$ of the second power source 6, as shown in FIGURE 1. The voltage $E_1'$ of capacitor 50 and $E_2$ of power source 6 are added together in opposite polarities so that when the voltages are equal the output of the comparator circuit is zero. The A-C signal generating circuit 7 produces an alternating current voltage at the output thereof only when the small D-C difference voltage of the comparator is of a certain polarity. For example, the relationship between the voltage $E_1'$ and $E_2$ to render the signal generating circuit 7 operative is $E_1'$ being less than $E_2$.

In the present invention, a circuit formed with a differential D-C amplifier and a multivibrator circuit controllably connected thereto may be utilized as the small A-C signal generating circuit. In this case, the terminals producing a voltage $E_1'$ and $E_2$ are respectively connected to the input terminals of the differential amplifier. Accordingly, the differential amplifier will serve as the comparator circuit. 8 is a transformer having a primary winding 81 and secondary windings 82, 83 and 84. The output end of the A-C signal generating circuit is connected to the primary windings 81 of the transformer 8 and the secondary winding 82 is connected to the control end (between the base and emitter) of the transistor element 2 for switching purposes. When the output of the A-C signal generating circuit 7 is zero and no voltage is applied across the emitter and collector of the transistor element 2, the element is held non-conductive between the emitter and collector thereof. For the period of time when A-C signals are produced in the A-C signal generating circuit, the transistor element 2 is controlled by the A-C signals to become conductive and non-conductive repeatedly at a certain time interval. Therefore, an intermittent current the amplitude of which is proportional to the output voltage $E_1$ of the first D-C power source 1 flows to a series circuit of resistors 3 and 4, and an intermittent voltage is produced across both terminals of the resistor 4 in proportion ot the intermittent current. This intermittent voltage is applied to the input of a filter circuit 5, at the output end of which is produced D-C voltage $E_1'$. When the output voltage $E_1$ of the aforementioned first D-C power source 1 is fully larger than the output voltage $E_2$ of the second D-C power source 6 and the D-C voltage $E_1$ produced at the output side of the filter circuit 5 by the intermittent operation of the switch element 2 is larger than the voltage $E_2$ of the second D-C power source, the A-C output of the A-C signal generator is zero and the transistor element 2 becomes non-conductive between the emitter and collector so that the voltage across the terminals of the resistor 4 also becomes zero. However, where the discharge time constant of a capacitor 50 of the filter 5 is selected sufficiently large, the D-C voltage $E_1'$ across the electrodes will begin to decrease gradually when the voltage across the resistor 4 becomes zero. Then, when $E_1'$ decreases lower than $E_2$ the output signal is produced again at the output side of the circuit 7 and the transistor element 2 starts to turn on and off. By repeating such operation the D-C voltage $E_1'$ produced at the output side of the filter circuit 5 is maintained to be equal to the output voltage $E_2$ of the second D-C power source.

The circuit generally indicated by the reference B is a second switch circuit, in which 21 is a transistor element for switch use, 91 is a third D-C power source, 31 and 41 are resistance elements forming a resistance type potential divider, 51 is a filter circuit and 10 and 11 are output terminals. The control end (between the base and emitter) of the transistor element 21 is connected to the secondary winding 83 of the transformer. Accordingly, the transistor element 21 is controlled to open and close in synchronism with the transistor element 2 of the aforementioned first circuit. As a result of this, current supplied from the third D-C power source through the transistor element 21 is also intermittent synchronously with the opening and closing of the first circuit, and an intermittent voltage is produced across the terminals of the output resistor 41 of the resistance type potential divider, producing its average voltage $E_4$ at the output ends 10 and 11 of the filter circuit 51.

The circuit generally indicated by the reference C is a third switch circuit, which is formed in the same manner as the aforesaid second switch circuit. A transistor element 22 of this circuit is controlled by the output of the secondary winding 84 of the transformer 8 in synchronism with the transistor element 2 of the first circuit. As a result of this, current supplied from a fourth D-C power source is also switched on and off in synchronism with the first circuit and an intermittent voltage is produced across the both terminals of an output resistor 42 of a resistance type potential divider, producing its average voltage $E_4'$ at output terminals 12 and 13 of a filter 52.

The operation of the device of this invention of such arrangement as described above will hereinafter be explained.

In the first circuit indicated by the reference A, the switching transistor element 2 periodically repeats to be non-conductive and intermittently-conductive as previously described, thereby holding the output voltage $E_1'$ of the filter circuit 5 substantially equal to the output voltage $E_2$ of the second D-C voltage. If now the repeating period of the two states of the transistor element is referred to as T second, the substantial conductive time of the transistor in one period is $t$ second, the resistance value of the resistance element 3 is $R_1$ ohm, that of the resistance element 4 is $R_2$ ohm and the output voltage of the first power source is $E_1$ volt, the output voltage $E_1'$ of the filter circuit 5 can be expressed by the following formula.

$$E_1' = E_1 \cdot \frac{R_2}{R_1 + R_2} \cdot \frac{t}{T}$$

Accordingly, since the switching operation of the transistor element 2 is carried out so as to be $E_1' = E_2$, the following relation is established between $E_1$ and $E_2$.

$$\frac{E_2}{E_1} = \frac{R_2}{R_1 + R_2} \cdot \frac{t}{T} \tag{1}$$

In the second and third circuits the switching operations of the transistor elements 21 and 22 are completely synchronous with that of the transistor element 2 of the first circuit, so that the following relations are established respectively between the voltage $E_3$ of the third D-C power source 91 and the output voltage $E_4$ and between the voltage $E_3'$ of the fourth D-C power source 92 and the output voltage $E_4'$, $$\frac{E_4}{E_3} = \frac{r_2}{r_1 + r_2} \cdot \frac{t}{T} \tag{2}$$

$$\frac{E_4'}{E_3'} = \frac{r_2'}{r_1' + r_2'} \cdot \frac{t}{T} \tag{2'}$$

where $r_1$, $r_2$ and $r_1'$, $r_2'$ are respectively resistance value of the resistors 31, 41 and 32, 42 of the second and third circuits. Therefore, the following calculation formula is obtained from the foregoing Formulas 1, 2 and 2'. Since the Formula 2' is exactly the same as the Formula 2, the following explanation will be made in connection with the Formulas 1 and 2.

(A) *Multiplication and division*

From the Formulas 1 and 2, $$\frac{E_2}{E_1} \cdot \frac{E_3}{E_4} = \frac{R_2}{R_1 + R_2} \cdot \frac{r_1 + r_2}{r_2} \tag{3}$$

In this case the right side of the Formula 3 is a constant and hence if it is expressed by K, the above Formula 3 is expressed as follows.

$$E_4 = K \cdot \frac{E_2 \cdot E_3}{E_1} \tag{4}$$

As is apparent from the foregoing Formula 4, there is obtained at the output ends 10 and 11 of the second circuit B a D-C voltage $E_4$ which is proportional to $$\frac{E_2 \cdot E_3}{E_1}$$

In the like manner, a D-C voltage $E_4'$ proportional to $$\frac{E_2 \cdot E_3'}{E_1}$$

is obtained at the output ends 12 and 13 of the third circuit C. These output voltages $E_4$ and $E_4'$ are electrically isolated from the first and second D-C power sources $E_1$ and $E_2$.

(B) *Square calculation*

If $E_2=E_3$ in an embodiment of this invention, the above Formula 4 becomes as follows.

$$E_4=K\cdot\frac{E_2^2}{E_1} \tag{5}$$

Accordingly, if $E_1$ is constant, $E_4$ is proportional to the square of $E_2$.

(C) *Other calculations*

In the above embodiment the intermittent voltage produced across the terminals of the resistance type potential divider 4 is introduced into the filter circuit 5. However, in the case where the varying voltages preduced at the both ends of the transistor element 2 is applied directly to the filter circuit 5, no voltage is impressed to the filter circuit 5 when the transistor 2 is held "on" and a voltage $E_1$ is impressed to the filter circuit 5 when the transistor 2 is held "off," so that the following relation is established.

$$E_1\left(1-\frac{t}{T}\right)=E_2 \tag{6}$$

$$\frac{E_4}{E_3}=\frac{t}{T} \tag{7}$$

From the above Formulas 6 and 7, the following relation is formed.

$$E_4=K'\frac{E_1-E_2}{E_1}\cdot E_3 \tag{8}$$

where K' is a constant. The foregoing Formulas 1 to 8, inclusive, are similarly formed between the Formulas 1 and 2'. As is apparent from the previous explanation, it is sufficient for the various calculations described under (A) to (C) that the above relation is established only between the first and second circuits or between the first and third circuits. Therefore, when the calculation of (A) to (C) are carried out independently, either one of the second and third circuits can be left out as shown in FIGURE 3.

Figure 3:
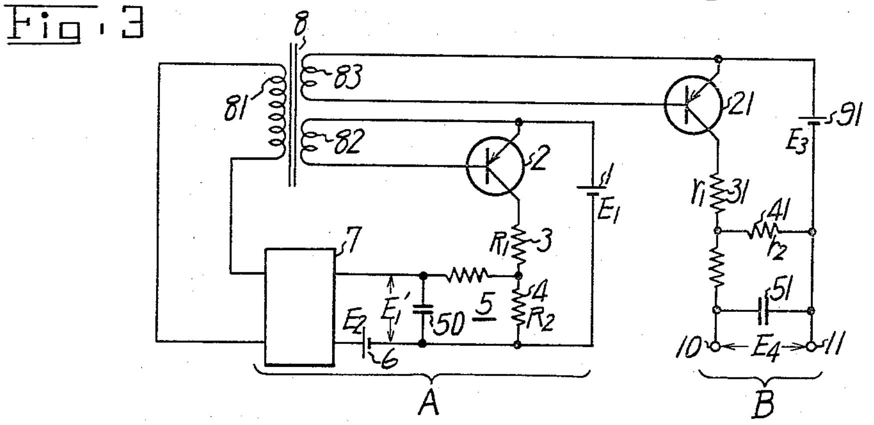
FIGURE 3 is a similar circuit diagram illustrating a further example of this invention.

The circuit illustrated in FIGURE 3 is a circuit having omitted the third circuit shown in FIGURE 1 but it is of exactly the same structure as the circuit of FIGURE 1 in other portions.

(D) *Square-root calculation*

Figure 2:
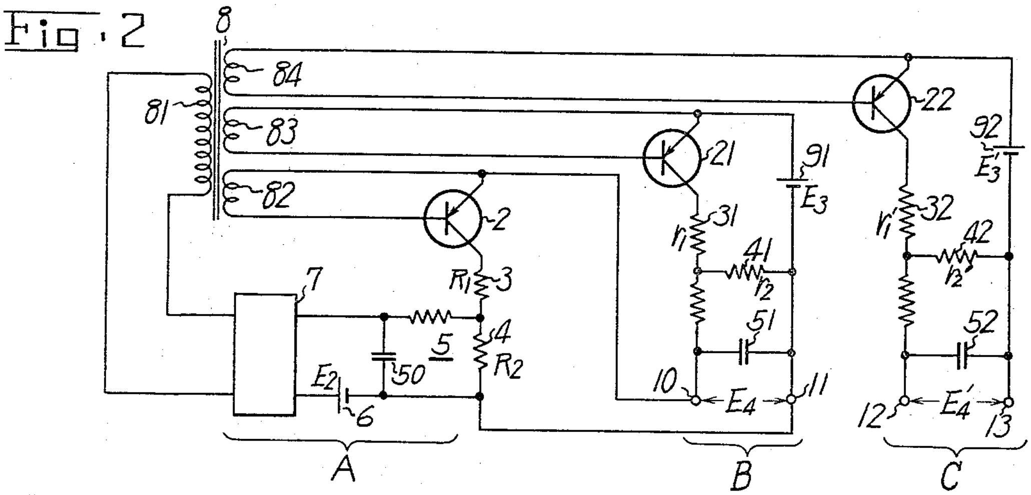
FIGURE 2 is a circuit diagram illustrating another example of this invention.

FIGURE 2 illustrates a circuit having some connections thereof changed for square-root calculation purpose. In this figure, the output voltage $E_4$ of the second circuit 2 is employed in place of the D-C power source $E_1$ of FIGURE 1. Therefore, the output terminals 10 and 11 of the second circuit are connected to the emitter of the switching transistor 2 and one end of the resistance type potential divider $R_2$ of the first circuit and other circuit connections are exactly the same as those of the circuit illustrated in FIGURE 1. In the circuit connected as in FIGURE 2, the aforementioned Formula 1 is as follows:

$$E_2=E_4\cdot\frac{R_2}{R_1+R_2}\cdot\frac{t}{T}\therefore\frac{t}{T}=\frac{R_1+R_2}{R_2}\cdot\frac{E_2}{E_4} \tag{9}$$

The Formula 2 is as follows.

$$E_4=E_3\cdot\frac{r_2}{r_1+r_2}\cdot\frac{t}{T} \tag{10}$$

From the above Formulas 9 and 10

$$\left(\frac{t}{T}\right)^2\cdot E_3\cdot\frac{r_2}{r_1+r_2}=\frac{R_1+R_2}{R_2}\cdot E_2\therefore\frac{t}{T}=\sqrt{\frac{(r_1+r_2)(R_1+R_2)}{r_2\cdot R_2}}\cdot\sqrt{\frac{E_2}{E_3}} \tag{11}$$

Furthermore, in the third circuit $$E_4'=E_3'\cdot\frac{r_2'}{r_1'+r_2'}\cdot\frac{t}{T} \tag{12}$$

From the Formulas 11 and 12 it follows that $$E_4'=\frac{r_2'}{r_1'+r_2'}\cdot\sqrt{\frac{(r_1+r_2)}{r_2}\cdot\frac{(R_1+R_2)}{R_2}}\cdot E_3'\cdot\sqrt{\frac{E_2}{E_3}} \tag{13}$$

If $r_1'=r_1$, $r_2'=r_2$ and $E_3'=E_3$ in the Formula 13 for the sake of simplicity, the Formula 13 becomes as follows.

$$E_4'=\sqrt{\frac{r_2}{(r_1+r_2)}\cdot\frac{(R_1+R_2)}{R_2}}\cdot\sqrt{E_2}\cdot\sqrt{E_3} \tag{14}$$

Accordingly, since $r_1$, $r_2$, $R_1$ and $R_2$ are constant, $E_4'$ is proportional to the square root of $E_2$ and $E_3$.

In the foregoing the power sources $E_1$, $E_2$, $E_3$, $E_3'$ and $E_4$ are of direct current, but the principle of the operation previously described can be established in connection with a ripple current and alternating current which slowly vary, as compared with the speed of the switch.

As has been explained in detail, the present invention is advantageous in that computing circuits may be formed simple with solid elements alone and that the input and the output of the calculation circuits may be insulated, since switching elements of first, second and third circuits are driven synchronously by respective transformers in insulated condition.

It will be apparent that many modifications and variations may be effected without departing from the scope of the novel concept of this invention.

What is claimed is:

1. An electronic computing circuit comprising:
a transformer having a primary winding and a plurality of secondary windings;
a first switching device having input and output terminals, said input terminals being connected to one of said secondary windings;
a first direct current voltage source connected to said first switching device for passing current through the output terminals thereof;
a first filter circuit connected to said output terminals of said first switching device to produce a direct current control voltage from the current passing through said first switching device;
an alternating current voltage generator having output terminals connected to the primary winding of said transformers;
means including a reference voltage source connected between said first filter circuit and the input terminals of said alternating current voltage generator for comparing said control voltage with said reference voltage and rendering said alternating current voltage generator operative only when a difference voltage of a given polarity exist between said control voltage and said reference voltage, the amplitude of the alternating current voltage produced by said alternating current voltage generator being controlled by the value of the difference voltage;
a second switching device having input and output terminals, said input terminals being connected to another of said secondary windings;
a second direct current voltage source connected to said second switching device for passing current through the output terminals thereof;
a second filter circuit connected to the output terminals of said second switching device:
whereby, the voltage developed at said second filter circuit is determined by the amplitude of the alternating current voltage produced by said alternating current voltage generator when said generator is rendered operative by said difference voltage.

2. An electronic computing circuit according to claim 1 further including a third switching device having input and output terminals, said input terminals connected to a third secondary winding of said transformer and said output terminals connected to said first switching device and to said first direct current voltage source to apply a reduced voltage to said first switching device in response to said difference voltage.

References Cited

UNITED STATES PATENTS

| | | | |
|---|---|---|---|
| 2,773,641 | 12/1956 | Baum | 235—194 |
| 3,966,306 | 12/1960 | Isabeau | 235—196 X |
| 3,141,969 | 7/1964 | Brendle | 235—193 |

MALCOLM A. MORRISON, *Primary Examiner.*

T. H. PAINTER, *Assistant Examiner.*